Oct. 10, 1961    R. M. TONE    3,003,539
CAR THEFT TIRE DEFLATOR
Filed April 18, 1960    2 Sheets-Sheet 1
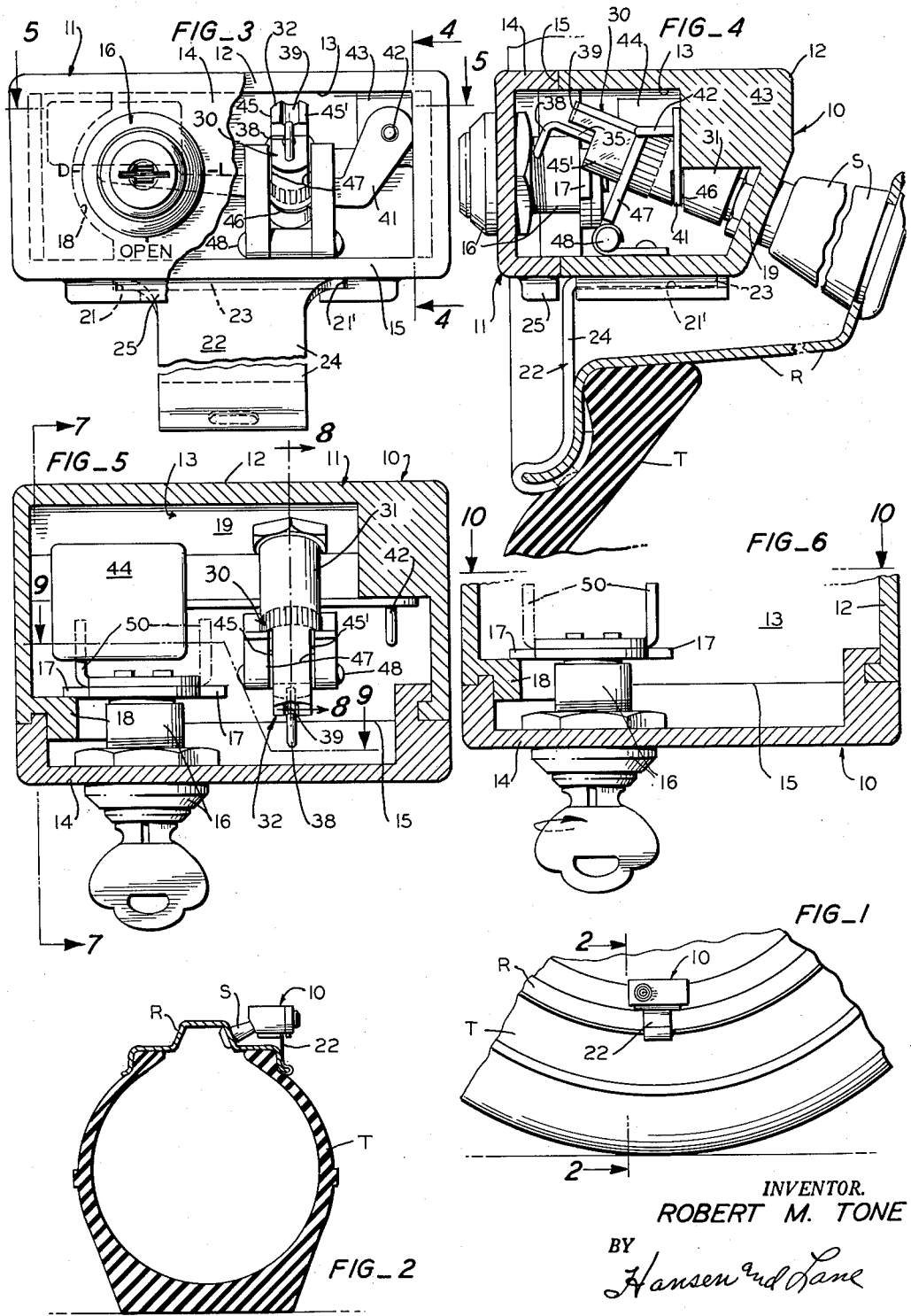
INVENTOR.
ROBERT M. TONE
BY
Hansen and Lane
HIS ATTORNEYS Oct. 10, 1961 R. M. TONE 3,003,539
CAR THEFT TIRE DEFLATOR
Filed April 18, 1960 2 Sheets-Sheet 2
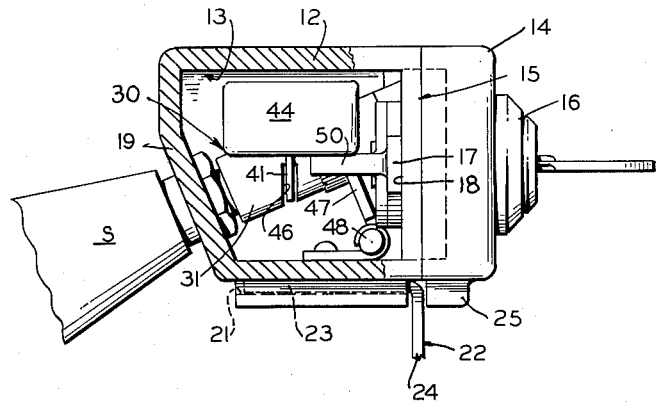
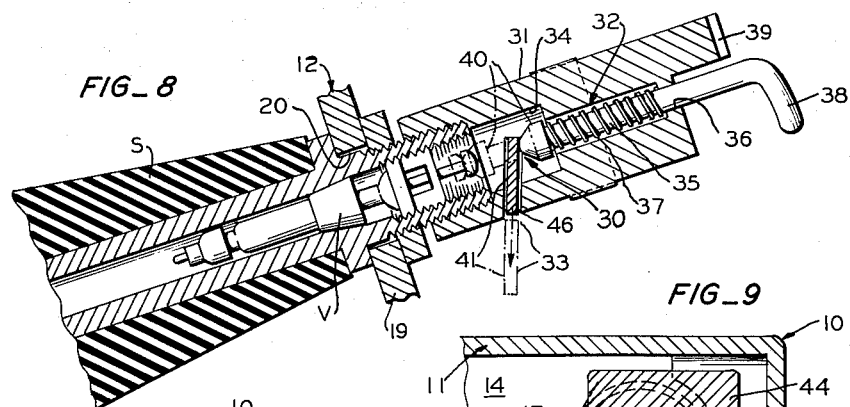
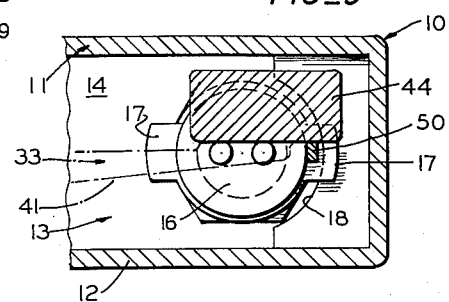
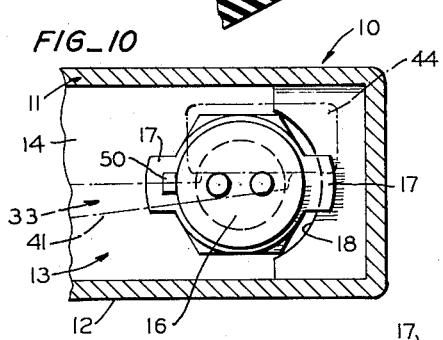
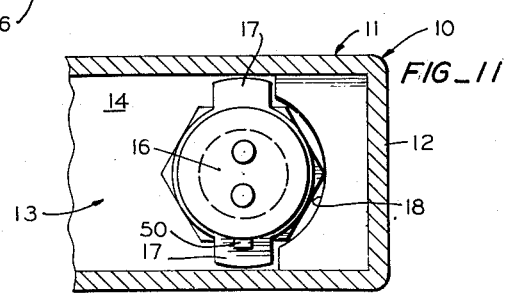
INVENTOR.
ROBERT M. TONE
BY
Hansen and Lane
HIS ATTORNEYS

United States Patent Office 3,003,539
Patented Oct. 10, 1961

3,003,539
CAR THEFT TIRE DEFLATOR
Robert M. Tone, 335 E. Maude, Sunnyvale, Calif.
Filed Apr. 18, 1960, Ser. No. 23,085
18 Claims. (Cl. 152—415)

This invention relates to a device for automatically deflating the tire of a vehicle to which it is attached.

The principal object of this invention is to insure against car theft by the provision of a simple yet effective device operatively connected to the valve steam of a vehicle tire for automatically deflating the tire within a short distance when the car is being used for mobility of its operation. In connection with this object it is a further object to provide a key controlled deflating means facilitating the pre-setting thereof in either a safe non-deflating condition during normal use of the vehicle or for automatic deflation of the tire during illegal or non-permissive use of such vehicle.

Car theft at present ranks third in this nation's crime situations and materially reflects on the rate being charged by insurance companies for coverage on such losses. More important, however, statistics show that there is great loss of life, limb and property connected with theft of cars due to the reckless and abandoned manner in which a thief drives the vehicle, violates traffic laws and regulations endangering everything in its path specially during pursuit by law enforcement officers. Law enforcement officers in attempting to stop the fleeing vehicle often try to render the car immobile or uncontrollable by shooting at the tires to render them flat.

It is an object of this invention to provide means for rendering a tire flat within a very short distance of travel of a vehicle during theft so as to make the vehicle immobile quickly during wrongful use. In connection with this object the present device is for the purpose of eliminating pursuit by officers or the necessity of firing bullets at the tires or other circumstances frought with the dangers, losses and inconvenient recovery of the vehicle which might take place if the device of the present invention is not employed.

It is another object of this invention to provide a lockable control means completely within the control of the car owner or driver so that he may drive the car with the tires fully inflated, the device being adapted to be set by the car owner or driver for operation automatically to deflate the tire during wrongful or non-permissive use thereof by a thief or anyone else.

In connection with this object it is an object to provide a simple yet effective device which may be triggered for automatic tripping by centrifugal force during rotation of the vehicle tire for relieving all air from the tire.

Another object is to provide a momentum actuated means in combination with a valve tripping mechanism which may be pre-set so as not to deflate the tire during normal operation of the vehicle.

It is another object to provide a simple yet effective lock box structure confining therein a momentum actuated tripping lever, a valve stem cap and trip means operatively associated therewith to automatically depress the valve stem of a tire when centrifugal force has affected the momentum actuated lever. These and other objects and advantages of the present invention will become apparent in the following description when read in the light of the drawings, in which:

FIG. 1 is a fragmentary, side elevational view of a vehicle tire and rim having the device of the present invention associated therewith.

FIG. 2 is a section through FIG. 1 taken along line 2—2 thereof.

FIG. 3 is a front elevation of the lock and deflating means as seen in FIG. 1 with portions thereof broken away for purposes of illustration.

FIG. 4 is a section through FIG. 3 taken along line 4—4 thereof.

FIG. 5 is a section through FIG. 3 taken along line 5—5 thereof.

FIG. 6 is a separate detailed section of a portion of the lock box illustrated in FIG. 5.

FIG. 7 is a sectional view through FIG. 5 taken along line 7—7 thereof.

FIG. 8 is a large scale sectional detail through the normal valve steam of a vehicle tire having the device of the present invention operatively connected thereto, this section being taken substantially along line 8—8 of FIG. 5.

FIG. 9 is a partial section from the interior of the box as seen in FIG. 5 and taken along line 9—9 thereof.

FIG. 10 is a view similar to that of FIG. 9 with parts thereof reversed to tire deflating position as seen in FIG. 6 and taken from line 10—10 of the latter.

FIG. 11 is a view similar to that of FIGS. 9 and 10 with the weight member removed to illustrate the lock mechanism in a position for removal of the lid from the lock box.

Referring to FIGS. 1, 2 and 4 the device of the present invention as indicated at 10 is adapted for connection to the valve stem S and rim R of a tire T of the vehicle to which it is to be connected. The device 10 generally includes a lock box 11 having a main body 12 providing a chamber 13 within which to confine the tire deflating mechanism of the present invention. This box 11 further includes a closure cover or lid 14 suitably integrated with the open side 15 of the main box body 12 for interlocking relation therewith. The closure cover 14 is provided with a key operated lock barrel 16 having a dual sided bolt member 17 secured thereto for bolting relation in two separate positions against a keeper 18 formed as a part of the main body 12 of the box 11.

In use the box 11 is applied to the valve stem S and rim R in such a manner that the key slot in the lock barrel 16 is outwardly exposed relative to the vehicle wheel but confined within the plane of rotation of the rim R. The box body 12 has one portion 19 of its rear wall disposed at an angle normal to the axis of the valve stem S and provided with an opening 20 for free sliding fit onto the threaded end of said valve stem S. A threaded nut secured to the threaded portion of the valve stem S is tightened down upon the latter within the chamber 13 of the box for securing the box to the valve stem.

Since the valve stem S is flexible and likely to vibrate, the box is further stabilized by being secured to the rim R. To this end the under side of the box body 12 is provided with grooved ledges 21—21' at either side thereof transversely of the wheel, i.e., from front to back of the box. A spring steel clip 22 having a base portion 23 slidably arranged with its edges in the grooves of ledges 21—21' has a downwardly bent portion 24 disposed rearwardly of the open front face 15 of the box body 12 for reasons later to become apparent. The portion 24 of the clip 22 terminates in a curved clip member somewhat like the attaching clips used on wheel balancing weights which are known in the art for securing the clip 22 to the rim R and tire T as illustrated in FIG. 4.

With the box body 12 thus secured to the valve stem and rim, the lid 14 of the box is now locked in place with the bolt member 17 engaged behind the keeper 18. As shown in FIG. 5 a detent 25 on the under side of the lid 14 matches the depth of the grooved ledges 21—21' on the box body 12 so as to overlay that portion 23 of the clip 22 which is slidably arranged in the grooved ledges 21—21' so as to prevent removal of the clip therefrom. In this manner removal of the box 11 from the tire and rim illegally or without permission is prevented.

From the foregoing it will be appreciated that the entire structure is completely locked upon the tire and rim and the tire deflating mechanism within the box cannot be tampered with without first opening the lock box 11 by the use of a key fitting the lock barrel 16.

Referring to FIGS. 4, 5 and 8 the tire deflating mechanism generally designated 30 comprises a cap member 31 having a trip member 32 spring urged toward the valve V of the tire and momentum actuated means 33 operatively associated with said spring loaded trip member for holding the latter in non-engaging position relative to said valve V.

The cap member 31 has one end provided with internal threading which fits upon the threaded end of the valve stem S as any valve cap would. The cap 31 has an internal chamber 34 adjacent the internal threading and beyond this chamber there is formed in the cap an axial bore 36.

The spring loaded trip mechanism 32 heretofore mentioned comprises a plunger 35 guided for sliding movement within the axial bore 36 in the cap 31. The bore 36 is enlarged somewhat adjacent the chamber 34 to receive a spring 37 which circumscribes the plunger 35. The inner end of the plunger 35 has an enlarged head 40 against which the compression spring 37 engages. The opposite end of the spring 37 engages the cap 31 to normally urge the entire plunger axially inward of the cap member and toward valve stem depressing position as seen in FIG. 8.

A portion of the plunger 35 extends beyond the bored end of the cap 31 and has a portion 38 disposed at right angles with respect to the plunger providing a handle for finger operation. The upper end of the cap 31 is cut away to provide a shelf-like seat 39 against which to hook the handle 38. In this manner the spring loaded plunger 35 is set in inactive position to prevent its axial movement toward the valve stem when the handle end 38 is seated on the keeper seat 39. Thus the cap 31 is used in this inactive position when the tire is serviced and fully inflated, the tire being serviced for air pressures when stem cap 31 is removed.

The momentum actuated means 33 comprises a lever 41 pivotally mounted on a pin 42 secured to a boss 43 formed integrally within and as a part of the main body 12 of the box structure 11. This lever 41 is so pivoted within the box structure as to swing in a plane parallel to the plane in which the vehicle tire rotates so that momentum during rotation of the tire can achieve operation of the lever by centrifugal force acting on a weight 44 at the free end of the lever 41. The lever is so configurated as to extend below the cap 31 secured to the valve stem S.

The cap 31 has a slot 46 cut into it at an angle relative to the axis of the cap so as to dispose the slot 46 vertical i.e., parallel to the wheel. When the cap 31 is on the stem S the slot 46 is disposed parallel to and in the plane in which the lever 41 swings to receive the lever 41 from below. The slot 46 extends into the chamber 34 sufficiently to allow the lever 41 to be disposed transversely of the axis of the cap 31. In other words, the lever 41 when fully seated in the slot 46, is disposed to obstruct movement of the plunger 35 toward the valve V in the tire stem S. It will thus be seen that when the handle 38 on plunger 35 is released from its seat 39 and turned away from the seat, the spring 37 forces the head 40 on the plunger into bearing engagement with the lever 41. The spring loaded plunger 35 is therefore triggered for immediate action when the lever 41 is removed from the slot, i.e., out of obstructing position relative to the head end 40 of the plunger 35.

The spring 37 is strong enough to prevent the lever 41 from falling by gravity out of the slot 46, the spring 37 being calibrated such that a very slight momentum created during rotation of the wheel effects the weight member 44 on the lever 41 to cause the lever 41 to slip from behind the spring loaded plunger 35. The spring 37 is also strong enough to overcome the strength of the spring within the conventional valve V within the stem S of the vehicle tire as illustrated in dotted lines in FIG. 8. When this occurs the conventional valve V, which heretofore had retained the air within the tire, will open and be held open to relieve the pressure of the air within the tire.

The valve cap 31 further is provided with two flat sides 45—45' which are perpendicular to the slot 46. A yoke means 47 is mounted within the box body 12, preferably pivotally as at 48 on the bottom of the box, so as to swing into and out of keeping relation with the flat surfaces 45—45' of the cap. This is to prevent turning of the cap 31 and misalignment of the slot 46 thereof relative to the plane in which the lever 41 will swing. In this manner it will be seen that irrespective of turnability of the cap 31 upon the threaded end of the valve stem S, the cap 31 and lever 41 are at all times maintained in operative relation with respect to each other so long as the yoke keeper member 47 is swung into keeping relation with the flat sides 45—45' of the cap structure. In other words, the slot 46 is always disposed to receive the lever 41.

As best seen in FIGS. 5 and 6 the lock means 16 in addition to carrying the bolts 17 also carries a blocking bar 50 for rotation therewith. This blocking bar 50 is offset laterally relative to the axis of rotation of the barrel 16 for disposition in either of two positions relative to the weight 44 on the tire deflating device 32. For purposes of clarity these two positions are designated "drive position" D and "locked position" L (see FIG. 3).

When in drive position D the blocking bar 50 is below the weight 44 as seen in FIGS. 7 and 9 so as to support the weight against movement under the influence of centrifugal force during driving of the vehicle by the owner or legal driver. However, upon rotation of the key and barrel 16 counter-clockwise FIG. 3 (clockwise FIG. 9) the owner or driver of the vehicle can position the bar 50 diametrically opposite its weight supporting position D and into locked position L in which the bar 50 is out of alignment with the weight 44 so that the weight is free to fall. However, the weight 44 and lever 41 being held by the spring loaded trip mechanism 32 as previously mentioned, no deflation of the tire will occur.

At this point it is assumed that the vehicle is parked and not in motion and nominally the device 10 is now locked for automatic deflation when the wheels of the vehicle begin to turn. Now then, should anyone drive the vehicle with the bar 50 disposed in non-obstructing or locked position L relative to the weight 44, centrifugal force will act upon the weight 44 which is pivoted on the pin 42 at a point eccentric to the axis of the wheel. The weight 44 will therefore swing radially away from center of the wheel and about the eccentric pin 42 causing a double throw on the weight whereby the lever 41 will quickly swing out of the slot 46 in the cap 31 within one or two revolutions of the wheel. The triggered plunger 35 is thereby automatically released for movement by its spring 37 to force the head end 40 of plunger 35 against the conventional valve V for depressing the valve V and the tire is thereby relieved of all of its air.

Deflation of the tire will result in flattening thereof so that the vehicle cannot be driven, at least not with safety or at any great speed. This will immediately deter or discourage the person who had illegally or without permission attempted to drive the vehicle and he in turn will abandon the vehicle within a very short distance from the point at which he took possession of it illegally. It will therefore be appreciated that damage to the vehicle and other property will thereby be materially minimized if not wholly eliminated and recovery of the vehicle quite convenient. Moreover, danger to and loss of life and limb will likewise be avoided. Obviously, this will materially effect a lowering of insurance rates on all forms of insurance connected with the operation of vehicles or damages resulting from illegal operation thereof.

Upon recovery of the vehicle or whenever the tires are to be checked for air pressure, anyone having the key to the lock 16 can gain access to the valve stem S. This is done by setting the lock to open position (FIGS. 1 and 11) wherein the bolts 17 are out of engagement with the keeper 18 in the main body 12 of the box 11. Thus the cover 14 may be removed so as to expose the deflating mechanism 30 within the chamber 13 provided by the body 12 of the lock box 11. The attendant can now grasp the portion 38 of plunger 35 to withdraw the latter against the action of spring 37 and turn the portion 38 into a position to rest upon the seat 39 at the top of the cap 31. The hinged yoke 47 is then swung outwardly of the box 11 and out of keeping engagement with the flattened sides 45—45' of the cap 31. The cap 31 is now free to be unscrewed from the threaded upper end of the valve stem S so that the nozzle of an air pressure hose may be applied thereto in the usual manner to inflate the tire T.

Once the tire is inflated to the proper air pressure, the cap 31 can again be applied to the valve stem S with the plunger 35 withdrawn, i.e., portion 38 hung on seat 39 of the cap. Thus the head end 40 of the plunger 35 is held out of bearing engagement with the conventional valve V. The slot 46 in the cap is again positioned to receive the lever 41; the yoke 47 again brought into keeping engagement with the flat sides 45—45' of the cap and the portion 38 of plunger released from the seat 39 so that the head end of the plunger 35 will bear against and be obstructed by the lever arm 41 in the slot 46. When the cover 14 is replaced and the key turned to drive position D the bar 50 will be disposed in supporting position beneath the weight 44 and the device set for permissive driving as before explained.

While I have described my new car theft tire deflator in specific detail it will be appreciated by those skilled in the art that the same is susceptible to modification, alteration and/or variation without departing from the spirit of my invention. I therefore desire to avail myself of all modifications, alterations and/or variations as fairly come within the purview of the appended claims.

What I claim as new and desire to protect by Letters Patent is:

1. A car theft tire deflator comprising a cap adapted to be secured to the valve stem of a tire having a conventional valve therein, a triggered mechanism including a spring urged plunger mounted in said cap for axial movement toward said valve stem for opening the valve therein, obstructing means in the path of said plunger and engaged thereby for obstructing movement thereof toward valve opening position, and momentum actuated means operatively connected to said obstructing means movable by centrifugal force to urge said obstructing means out of the path of said plunger when said tire rotates.

2. A car theft tire deflator comprising a cap adapted to be threadably secured to a conventional tire valve stem having a conventional valve therein, a spring loaded plunger mounted on said cap and normally urged along an axial path toward said valve stem for opening the valve therein, a lever engaged by said spring urged plunger for obstructing movement thereof toward said valve, and momentum means on said lever movable under the influence of centrifugal force for moving said lever out of obstructing position relative to said plunger when said tire rotates.

3. A car theft tire deflator comprising a lock box secured to the valve stem of a vehicle tire, said stem having a conventional pneumatic valve therein, said box forming a chamber confining the threaded end of said valve stem, a stem cap, a spring urged plunger mounted in said cap for axial movement toward the valve in said valve stem for opening the latter, said cap having a slot formed therein transverse to the axis thereof and in the plane of rotation of said tire, a lever pivotally mounted in said lock box for swinging movement into the slot in said cap for obstructing axial movement of said plunger toward valve opening position, and weight means on said lever movable under the influence of centrifugal force when said tire rotates to move said lever out of said slot.

4. A car theft tire deflator for a vehicle comprising a lock box secured to the valve stem of a vehicle tire, said stem having a conventional pneumatic valve therein, said box forming a chamber confining the threaded end of said valve stem, a screw cap threaded onto said valve stem within said box, a sping urged plunger mounted in said cap for axial movement toward the valve in said valve stem for opening the latter, said cap having a slot formed therein transverse to the axis thereof and in the plane of rotation of said tire, a lever pivotally mounted in said lock box for swinging movement into the slot in said cap for obstructing axial movement of said plunger toward valve opening position, weight means on said lever movable under the influence of centrifugal force to move said lever out of said slot when said tire rotates, and a key operated lock on said lock box having a weight obstructing bar disposed to obstruct movement of said weight during permissive driving of the vehicle and movable by said key into locked non-obstructing position relative to said weight.

5. A car theft tire deflator for a vehicle comprising a lock box having an open side interlockingly connectable to a box lid, means for securing said box to the valve stem of a tire having a conventional pneumatic valve therein for confining the threaded end of said valve stem within said box, a screw cap on the threaded end of said valve stem, a triggered mechanism including a plunger mounted in said cap for axial movement toward the valve in said valve stem for opening the latter, said cap having a slot formed therein transverse to the axis thereof and in the plane of rotation of said tire, a lever pivotally mounted within said lock box for swinging movement into and out of the slot in said cap, said plunger normally engaging said lever when it is within said slot for obstructing axial movement of said plunger toward valve opening position, weight means on said lever movable under the influence of centrifugal force when said tire rotates to move said lever out of said slot, keeper means within said box, key operated lock means on the lid of said box including diametrically opposite bolts engageable with said keeper in either of two positions, and a weight obstructing bar on said lock means for movement with said bolts into obstructing and non-obstructing positions relative to said weight means.

6. A car theft tire deflator for a vehicle comprising a lock box having an open side interlockingly connectable to a box lid, means for securing said box to a tire valve stem having a conventional pneumatic valve therein to thereby confine the threaded end of said valve stem within said box, a screw cap secured to the threaded end of said valve stem, a spring loaded plunger mounted in said cap for axial movement toward the valve in said valve stem for opening the latter, a seat formed on said cap, said plunger having a crooked end engageable with said seat for holding said plunger in non-operative position against the action of its spring, said cap having a slot formed therein substantially transverse to the axis thereof and in the plane of rotation of said tire, a lever pivotally mounted within said lock box for swinging movement into and out of the slot in said cap, said lever, when disposed in said slot, obstructing axial movement of said plunger toward valve opening position when the crooked end of said plunger is released from said seat, weight means on said lever movable under the influence of centrifugal force, when said tire rotates, to move said lever out of said slot against the action of said plunger, keeper means within said box, a key operated lock mounted on said lid having diametrically opposite bolts either of which engages said keeper means in either of two diametrically opposite locking positions of said lock, and a weight obstructing bar on said lock for supporting said weight against operation by centrifugal force when said bolts are in one of said locking positions and movable diametrically with said bolts to the opposite locking position for positioning said bar in non-obstructing position relative to said weight.

7. A theft deterrent tire deflator for a vehicle comprising a lock box having an open side interlockingly connectable to a box lid, means for securing said box to a tire valve stem having a conventional pneumatic valve therein to thereby confine the threaded end of said valve stem within said box, a pair of ledges formed on the underside of said box, a clip secured to the rim of said tire having a portion slidably arranged between the ledges on the underside of said box for stabilizing the latter relative to said valve stem, a cap on the threaded end of said valve stem, a triggered mechanism including a plunger mounted in said cap for axial movement toward the valve in said valve stem for opening the latter, said cap having a slot formed therein transverse to the axis thereof and in the plane of rotation of said tire, a lever pivotally mounted within said lock box for swinging movement into and out of the slot in said cap, said plunger normally engaging said lever when it is within said slot for obstructing axial movement of said plunger toward valve opening position, weight means on said lever movable under the influence of centrifugal force when said tire rotates to move said lever out of said slot, a detent on said box lid adapted to overlay that portion of said clip arranged between the ledges on the underside of said box for obstructing sliding movement of the box off of said portion of said clip, keeper means within said box, key operated lock means on the lid of said box including diametrically opposite bolts engageable with said keeper to lock said box when said bolts are in either of two position, and a weight obstructing bar operatively connected with said bolts for movement therewith into obstructing and non-obstructing positions relative to said weight means.

8. A theft deterrent tire deflator for a vehicle comprising a lock box having an open side interlockingly connectable to a box lid, means for securing said box to a tire valve stem having a conventional pneumatic valve therein to thereby confine the threaded end of said valve stem within said box, a pair of ledges formed on the underside of said box, a clip secured to the rim of said tire having a portion slidably arranged between the ledges on the underside of said box for stabilizing the latter relative to said valve stem, a cap on the threaded end of said valve stem, a triggered mechanism including a plunger mounted in said cap for axial movement toward the valve in said valve stem for opening the latter, said cap having a slot formed therein substantially transverse to the axis thereof, said cap having key faces formed thereon perpendicular to the slot formed in said cap, yoke means mounted within said box for movement into and out of a position of engaging the key faces on said cap for holding the slot formed in the latter in the plane of rotation of said tire, a lever pivotally mounted within said lock box for swinging movement into and out of the slot in said cap, said plunger normally engaging said lever when it is within said slot for obstructing axial movement of said plunger toward valve opening position, weight means on said lever movable under the influence of centrifugal force when said tire rotates to move said lever out of said slot, a detent on said box lid adapted to overlay that portion of said clip arranged between the ledges on the underside of said box for obstructing sliding movement of the box off of said portion of said clip, keeper means within said box, key operated lock means on the lid of said box including diametrically opposite bolts engageable with said keeper to lock said box when said bolts are in either of two positions, and a weight obstructing bar operatively connected with said bolts for movement therewith into obstructing and non-obstructing positions relative to said weight means.

9. A car theft tire deflator for a vehicle comprising a lock box secured to a tire valve stem having a conventional pneumatic valve therein, said box forming a chamber confining the threaded end of said valve stem, a cap threaded onto the threaded end of said valve stem, a spring urged plunger mounted in said cap for axial movement toward the valve in said valve stem for opening the latter to deflate the tire, said cap having a slot formed therein substantially transverse to the axis thereof, a pair of flat faces formed on said cap perpendicular to the slot formed therein, yoke means removably mounted within said box for engaging the faces on said cap for holding the slot formed in the latter in the plane of rotation of said tire, a lever pivotally mounted in said lock box for swinging movement into the slot in said cap for obstructing axial movement of said plunger toward valve opening position, and weight means on said lever movable under the influence of centrifugal force when said tire rotates to move said lever out of said slot to thereby release said plunger for movement toward said valve.

10. A car theft tire deflator for a vehicle comprising a lock box secured to a tire valve stem having a conventional pneumatic valve therein, said box forming a chamber confining the threaded end of said valve stem, a cap threaded onto the threaded end of said valve stem, a spring urged plunger mounted in said cap for axial movement toward the valve in said stem for opening the latter to deflate the tire, said cap having a slot formed therein substantially transverse to the axis thereof, a pair of flat faces formed on said cap perpendicular to the slot formed therein, yoke means removably mounted within said box for engaging the faces on said cap for holding the slot formed in the latter in the plane of rotation of said tire, a lever pivotally mounted in said lock box for swinging movement into the slot in said cap for obstructing axial movement of said plunger toward valve opening position, weight means on said lever movable under the influence of centrifugal force when said tire rotates to move said lever out of said slot to thereby release said plunger for movement toward said valve, and key operated means on said lock box having a weight obstructing bar disposed to obstruct movement of said weight during permissive use of said vehicle and movable by said key operated means into locked non-obstructing position relative to said weight.

11. A car theft tire deflator for a vehicle comprising a lock box secured to a tire valve stem having a conventional pneumatic valve therein, said box forming a chamber confining the threaded end of said valve stem, a cap threaded onto the threaded end of said valve stem, a spring urged plunger mounted in said cap for axial movement toward the valve in said valve stem for opening the latter to deflate the tire, said cap having a slot formed therein substantially transverse to the axis thereof, a pair of flat faces formed on said cap perpendicular to the slot formed therein, yoke means removably mounted within said box for engaging the faces on said cap for holding the slot formed in the latter in the plane of rotation of said tire, a lever pivotally mounted in said lock box for swinging movement into the slot in said cap for obstructing axial movement of said plunger toward valve opening position, and weight means on said lever movable under the influence of centrifugal force when said tire rotates to move said lever out of said slot to thereby release said plunger for movement toward said valve, said lock box having an open side provided with a keeper ledge, a lid for said box having interlocking relation with the open side thereof, a key operated lock mounted on said lid having diametrically opposite bolts for engaging said keeper ledge when in either of two diametrically opposite box locking positions, and a weight obstructing bar on said lock within said box for supporting said weight against operation by centrifugal force when said bolts are in one locking position and movable diametrically with said bolts to the opposite locking position for removing said bar from weight obstructing position.

12. The combination with means for deflating a tire mounted on the rim of a wheel of a vehicle to deter non-permissive use of said vehicle comprising a lock box having an open sided compartment secured to the valve stem of said tire for confining said tire deflating means within said box, means for stabilizing said lock box relative to said valve stem including a pair of ledges on the underside of said box, a clip secured to said rim and having a portion slidably arranged in the ledges on the underside of said box, and a lock operated lid interlockingly connectable to the open side of said box and having an integral detent thereon for obstructing sliding movement of said box off of that portion of said clip arranged in the ledges on the underside of said box.

13. The combination with momentum actuated means for automatically deflating a tire mounted on the wheel rim of a vehicle for deterring non-permissive use of said vehicle comprising a lock box having an open sided compartment secured to the valve stem of said tire for confining said valve stem and tire deflating means within said box, means for stabilizing said lock box relative to said valve stem including a pair of slide ledges formed on the underside of said box, a clip secured to said rim and having a portion slidably arranged in said slide ledges, a lid interlockingly connectable to the open side of said box having an integral detent thereon for obstructing sliding movement of said box off of that portion of said clip arranged in said ledges when said lid is locked in place, a keeper within said box, a key operated lock on said lid having a pair of diametrically opposed bolts either one of which is engageable with said keeper when said key operated lock is in either of two locked positions, and means on said key operated lock within said lock box for movement with said bolts into obstructing and non-obstructing position relative to said momentum actuated means.

14. A car theft tire deflator for a vehicle comprising a lock box having an open side interlockingly connectable to a box lid, means for securing said box to a tire valve stem having a conventional pneumatic valve therein to thereby confine the threaded end of said valve stem within said box, a screw cap on the threaded end of said valve stem, a spring loaded plunger mounted in said cap for axial movement toward the valve in said valve stem for opening the latter, a seat formed on said cap, said plunger having means thereon engageable with said seat for temporarily holding said plunger in non-operative position against the action of its spring, said cap having a slot formed therein substantially transverse to the axis thereof, said cap having flat faces formed thereon perpendicular to the slot formed in said cap, yoke means pivotally mounted within said box for movement out and into engagement with the key faces on said cap for holding the latter with the slot formed therein disposed in the plane of rotation of said tire, a lever pivotally mounted within said lock box for swinging movement into and out of the slot in said cap, said lever when in said slot obstructing axial movement of said plunger toward valve opening position when said plunger is released from said seat, weight means on said lever movable under the influence of centrifugal force when said tire rotates to move said lever out of said slot against the action of said spring loaded plunger, keeper means with said box, a key operated lock mounted on said lid having diametrically opposite bolts for engaging said keeper means in either of two diametrically opposite locking positions of said lock, and a weight obstructing bar on said lock for supporting said weight against operation by centrifugal force when said bolts are in one of said locking positions and movable diametrically with said bolts to the opposite locking position for positioning said bar in non-obstructing position relative to said weight.

15. A car theft tire deflator for a vehicle comprising a lock box having an open side interlockingly connectable to a box lid, means for securing said box to a tire valve stem having a conventional pneumatic valve therein to thereby confine the threaded end of said valve stem within said box, a screw cap on the threaded end of said valve stem, a spring loaded plunger mounted in said cap for axial movement toward the valve in said valve stem for opening the latter, a seat formed on said cap, said plunger having a handle end engageable with said seat for holding said plunger in non-operative position against the action of its spring, said cap having a slot formed therein transverse to the axis thereof and in the plane of rotation of said tire, a lever pivotally mounted within said lock box for swinging movement into and out of the slot in said cap, said lever, when disposed in said slot, obstructing axial movement of said plunger toward valve opening position, when the handle end of said plunger is released from said seat weight means on said lever movable under the influence of centrifugal force when said tire rotates to move said lever out of said slot against the action of said plunger, keeper means with said box, a key operated lock mounted on said lid having diametrically opposite bolts for engaging said keeper means in either of two diametrically opposite locking positions, and a weight obstructing bar on said lock for supporting said weight against operation by centrifugal force when said bolts are in one of said locking positions and movable diametrically with said bolts to the opposite locking position for positioning said bar in non-obstructing position relative to said weight.

16. Means for automatically deflating a tire on a vehicle during non-permissive use of the latter comprising a key operated lock box secured to the rim and valve stem of said tire, a cap secured to the valve stem of said tire within said lock box, a triggered mechanism mounted in said cap triggerable for movement toward said valve stem for opening the valve therein, and momentum actuated means normally obstructing movement of said triggered mechanism toward valve opening position during non use of said vehicle and movable out of obstructing position relative to said trigger mechanism when said tire rotates during use of said vehicle.

17. Means for automatically deflating a tire on a vehicle during non-permissive use thereof comprising a lock box secured to the valve stem of said tire, a cap secured to the valve stem of said tire within said lock box, a triggered mechanism on said cap for opening the valve therein, means in said lock box normally obstructing said trigger mechanism from opening said valve, and momentum means operatively connected to said obstructing means effected by centrifugal force for moving the latter out of trigger obstructing position when said tire turns during operation of said vehicle.

18. Means for automatically deflating a tire on a vehicle during non-permissive use thereof comprising a lock box secured to the valve stem of said tire, a cap secured to the valve stem of said tire within said lock box, a triggered mechanism on said cap for opening the valve therein, means in said lock box normally obstructing said trigger mechanism from opening said valve, momentum means operatively connected to said obstructing means effected by centrifugal force for moving the latter out of trigger obstructing position when said tire turns during operation of said vehicle, and a key operated means within said lock box movable by a key into drive position to block movement of said momentum means by centrifugal force and into locked position to free said momentum means for action by centrifugal force at the option of the user of said key.

References Cited in the file of this patent

UNITED STATES PATENTS

| | | |
|---|---|---|
| 2,470,873 | Seitz | May 24, 1949 |
| 2,737,223 | Plath | Mar. 6, 1956 |